Aug. 10, 1937.  J. MANGIN  2,089,390
ELECTRIC FIXTURE SUPPORTING DEVICE
Filed Aug. 21, 1935  2 Sheets-Sheet 1
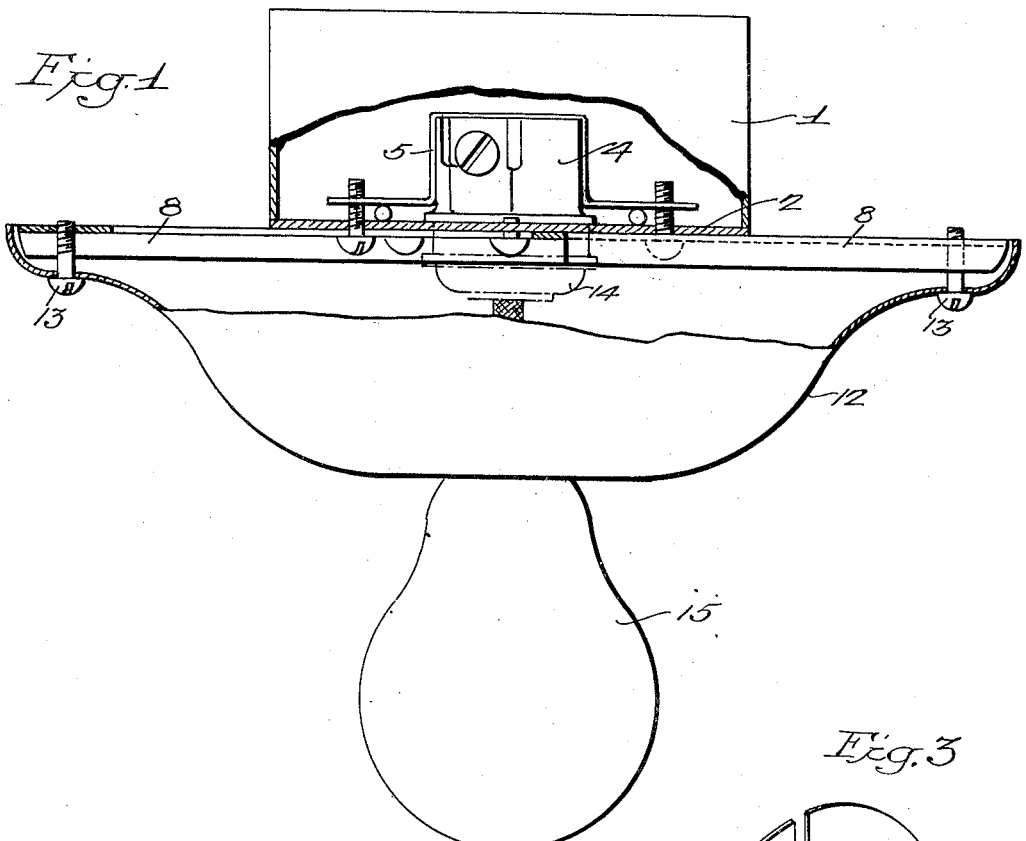
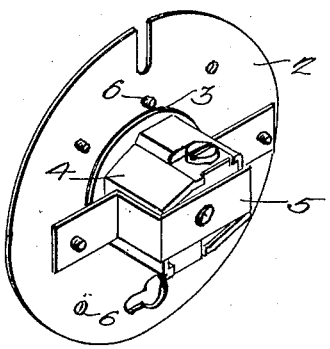
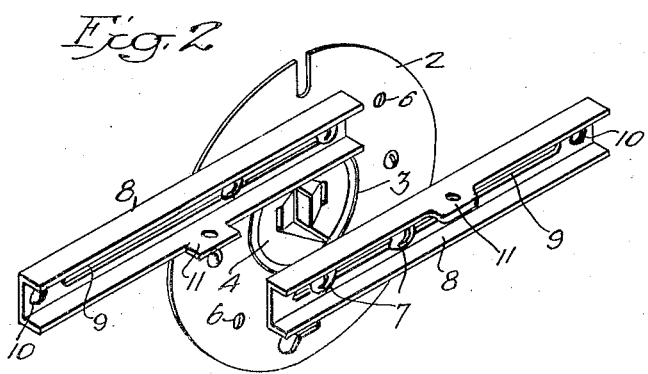
Inventor
James Mangin
by his Attorneys.
Howson & Howson Aug. 10, 1937.　　　　J. MANGIN　　　　2,089,390
ELECTRIC FIXTURE SUPPORTING DEVICE
Filed Aug. 21, 1935　　　2 Sheets-Sheet 2

Inventor:
James Mangin
By his Attorneys
Houston & Houston

Patented Aug. 10, 1937

2,089,390

UNITED STATES PATENT OFFICE 2,089,390

ELECTRIC FIXTURE SUPPORTING DEVICE

James Mangin, New Brunswick, N. J., assignor to New Brunswick Electric Supply Company, New Brunswick, N. J., a corporation of New Jersey Application August 21, 1935, Serial No. 37,232

4 Claims. (Cl. 248—343)

This invention relates to devices for mechanically and electrically connecting electric fixtures of varying sizes to an outlet box. The principal object of the invention is to provide a novel device by means of which fixtures of varying sizes may be connected mechanically and electrically to an outlet box after the cover of the box has been applied to the box and without the necessity of removing the cover. The invention is applicable, for example, to new buildings where it is customary and desirable to mount electric fixtures after the plastering and paper hanging or wall decoration has been completed. By the use of the present invention, the plastering and wall decoration may be finished neatly about an outlet box with the cover thereof in place, and an electric fixture may then be mounted and electrically connected without disturbing the outlet box cover or the plastering and wall decoration thereabout.

A further feature of the invention is that it provides a device which is adapted for the mechanical and electrical connection of either a ceiling fixture or a wall fixture in the manner above mentioned.

The invention may be fully understood by reference to the accompanying drawings illustrating a preferred embodiment thereof.

In the drawings:

Fig. 1 is an elevational view of the device with an associated ceiling fixture, certain parts being shown in section for the sake of illustration;

Fig. 2 is a perspective view of an outlet box cover with the features of the invention applied thereto;

Fig. 3 is a perspective view of the outlet box cover showing the rear thereof.

Figure 4:
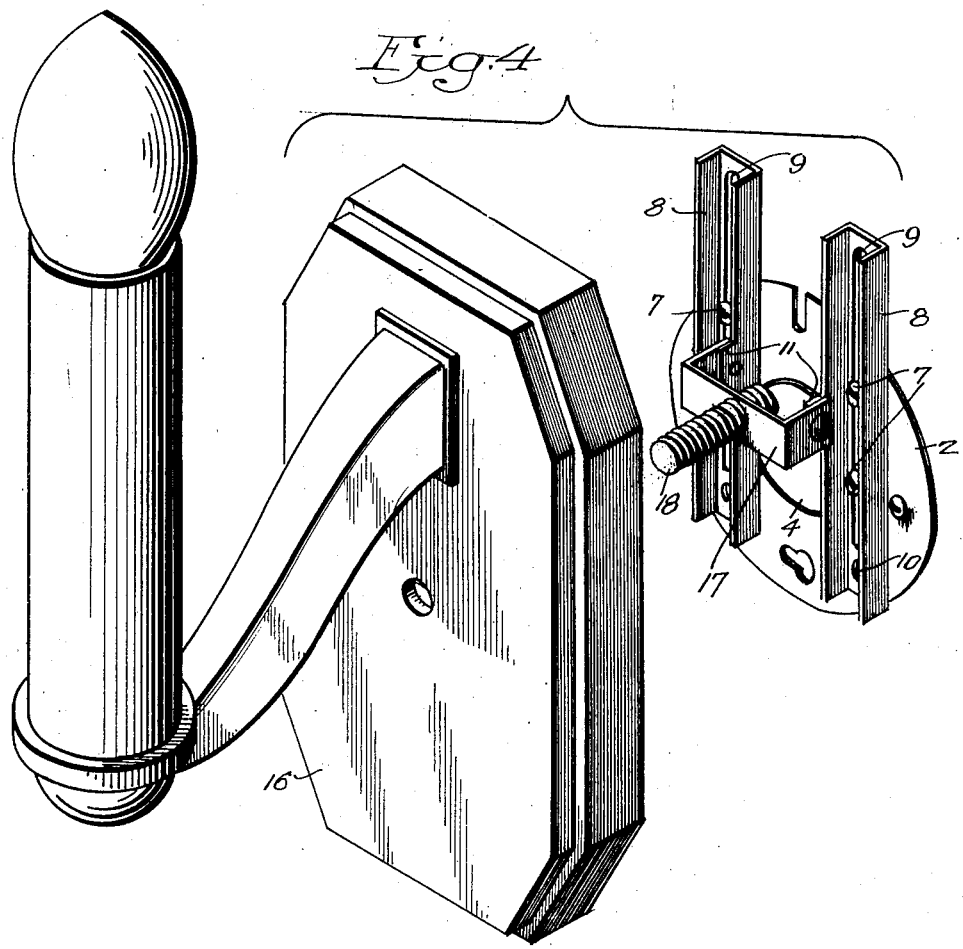
Fig. 4 is a perspective view illustrating the adaptability of the invention for the mounting of a wall fixture.

Referring to Figs. 1 to 3, in Fig. 1, there is shown a conventional outlet box 1 having a cover 2. As shown in Fig. 2, in accordance with the present invention, the outlet box cover 2 is provided with a central aperture 3 and a plug receptacle 4 is mounted upon the cover at the said aperture. This receptacle is arranged so that a plug may be inserted from the front of the outlet box cover. The receptacle may be mounted upon the cover as shown in Fig. 3 by means of a bracket 5 attached to the rear face of the cover.

In further accordance with the invention, the cover is provided with a row of small threaded openings 6 on each side of the central opening 3, the openings of each row being aligned transversely with the corresponding openings of the other row. These small openings 6 are for the reception of attachment screws 7 by means of which straps 8 are adjustably secured to the front face of the box cover. To this end, the straps 8 are provided with slots 9 through which the screws 7 extend. The straps 8 are preferably of channel-like cross section, and each of the straps is provided with an aperture 10 at one end thereof. Each strap is further provided with a laterally extending apertured ear or lug 11, the purpose of which will be apparent later.

In the adaptation of the device for the mounting of a ceiling fixture, the straps may be mounted upon the outlet box cover in the manner shown in Fig. 2. It will be noted that the center openings of each row and diagonally opposed openings are utilized. It will be clearly seen that by moving the straps in opposite directions, the apertures 10 thereof may be located at varying diametrical distances apart, whereby the device may be adjusted for the mounting of different sized fixtures. As shown in Fig. 1, for example, the openings 10 may be positioned so as to accommodate a canopy 12 which may be attached to the supporting straps 8 by screws 13 passing through the openings 10. Since the openings 10 may be made to lie at the extremities of a diameter passing through the center of the outlet box, a fixture canopy or the like may be supported at points diametrically opposite one another. Should the openings in the fixture canopy be slightly offset and not exactly diametrically aligned, however, the straps 8 may be adjusted to cause the openings 10 to align exactly with the canopy openings. This is a very important advantage of the device.

It will be apparent that a fixture may be mounted and may be electrically connected without the necessity of removing the outlet box cover. To effect the electrical connection, it is merely necessary to insert a plug, such as shown at 14 in Fig. 1, into the receptacle 4, the plug 14 being electrically connected, of course, to the socket of lamp 15. Thus, the invention enables the mechanical attachment and electrical connection of varying sized fixtures without removing the outlet box cover. This permits the permanent mounting and closing of the outlet box prior to plastering and wall decoration, and it enables the neat finishing of the plastering and wall decoration about the outlet box prior to mounting of the electric fixtures. Moreover, it facilitates replacement of fixtures, it being unnecessary to remove the box cover.

Referring now to Fig. 4, in the use of the device for the mounting of a wall type fixture, such as shown at 16, the supporting straps 8 are mounted upon the box cover as illustrated with the screws 7 in corresponding openings of the parallel rows of openings 6 rather than in the staggered positions of Fig. 2. In this manner, the straps 8 are adapted for vertical adjustment in the same direction. The straps are disposed with the ears or lugs 11 directly opposite one another and there is provided a yoke 17 which has its ends connected to the ears 11. The yoke carries a threaded stud 18 which is adapted to support the plate of the fixture, as will be obvious.

It will be seen that in this adaptation, the device enables the mounting of a wall type fixture at any desired vertical height within the range of adjustment provided. It will also be seen that the mounting of the fixture and the electrical connection thereof may be made without disturbing the outlet box cover.

In reference to the invention generally, it is important to note that it attains the desideratum of the fire underwriters that completely enclosed metal boxes be employed and that the electrical conductors and connections thereof be permanently enclosed in such boxes as far as possible. By enabling the permanent attachment of the box cover, the present invention reduces the fire hazard to a minimum and, at the same time, enables the mounting of varying sized fixtures.

While the invention has been disclosed with reference to a preferred embodiment, it will be understood that it is capable of modification, particularly as to the details of construction. Any such modifications, therefore, as fall within the scope of the appended claims are deemed to be part of the invention.

I claim:

1. An adjustable device for supporting varying sized electric fixtures from an installed outlet box cover carrying a plug receptacle, comprising a pair of fixture-supporting straps adjustably carried in laterally-spaced parallel relation upon the outer face of said cover on opposite sides of said receptacle and arranged for longitudinal adjusting movement in opposite directions.

2. A device for supporting an electric fixture from an installed outlet box cover, comprising a pair of fixture-supporting straps adjustably carried in spaced relation upon the outer face of said cover, a yoke extending transversely between said straps and connected thereto, and means for attaching a fixture to said yoke.

3. The combination with an outlet box cover carrying a centrally disposed plug receptacle and having parallel rows of aligned openings on opposite sides of said receptacle, of a pair of fixture-supporting straps aligned respectively with said rows of openings and having slots adapted to slidably seat attachment elements extending into said openings, whereby said straps may be adjusted longitudinally in opposite directions or in the same direction, said straps having corresponding attachment portions adapted to align with one another when said straps are arranged in coextensive relation, and a yoke adapted for attachment to said portions when they are aligned with one another.

4. The combination with an outlet box cover carrying a centrally disposed plug receptacle and having parallel rows of aligned openings on opposite sides of said receptacle, of a pair of fixture-supporting straps aligned respectively with said rows of openings and having slots adapted to slidably seat attachment elements extending into said openings, whereby said straps may be adjusted longitudinally in opposite directions or in the same direction.

JAMES MANGIN.